United States Patent
Reedy

(10) Patent No.: US 11,321,434 B2
(45) Date of Patent: May 3, 2022

(54) SMART TRAFFIC CONTROLLER CABINET

(71) Applicant: Reedwick, LLC, Douglasville, GA (US)

(72) Inventor: Jonathan Matthew Reedy, Douglasville, GA (US)

(73) Assignee: REEDWICK, LLC, Douglasville, GA (US)

( * ) Notice: Subject to any disclaimer, the term of this patent is extended or adjusted under 35 U.S.C. 154(b) by 564 days.

(21) Appl. No.: 16/267,673

(22) Filed: Feb. 5, 2019

(65) Prior Publication Data

US 2020/0250285 A1 Aug. 6, 2020

(51) Int. Cl.
| | |
|---|---|
| G06F 21/00 | (2013.01) |
| G06F 21/32 | (2013.01) |
| H05K 5/02 | (2006.01) |
| G06K 9/00 | (2022.01) |
| G06F 21/86 | (2013.01) |

(52) U.S. Cl.
CPC ............ G06F 21/32 (2013.01); G06F 21/86 (2013.01); G06K 9/00288 (2013.01); H05K 5/0208 (2013.01)

(58) Field of Classification Search
CPC ..... G06F 21/32; G06F 21/86; G06K 9/00288; H05K 5/0208
See application file for complete search history.

(56) References Cited

U.S. PATENT DOCUMENTS

| | | | | |
|---|---|---|---|---|
| 7,250,875 | B2 * | 7/2007 | Schnackenberg | G08G 1/095 200/276.1 |
| 8,452,960 | B2 * | 5/2013 | Etchegoyen | H04L 63/101 713/168 |
| 8,812,701 | B2 * | 8/2014 | Etchegoyen | H04L 63/08 709/229 |
| 9,026,806 | B2 * | 5/2015 | Falk | H04L 63/061 713/194 |
| 9,111,445 | B1 * | 8/2015 | Pashel | G08G 1/087 |

FOREIGN PATENT DOCUMENTS

WO   WO2019014775   *   1/2019

OTHER PUBLICATIONS

Min, KyungShin/Sung YeonSik; Encore Link Co, Ltd; Electrical Security Locking System for Ground Facility Case. Application No. 1020130130025; Date Oct. 30, 2013; pp. 1-10.*

* cited by examiner

Primary Examiner — Hosuk Song
(74) Attorney, Agent, or Firm — Cantor Colburn LLP

(57) ABSTRACT

Systems and methods for authorizing or preventing access to a traffic controller cabinet are described. A first input may be received at a traffic controller cabinet. The first input may be indicative of an identity of an individual attempting to access the traffic controller cabinet. If the individual is determined not to be authorized to access the traffic controller cabinet, a blocking mechanism may be activated to prevent the individual from making any modification to one or more components of the traffic controller cabinet such as a software component.

17 Claims, 5 Drawing Sheets

SMART TRAFFIC CONTROLLER CABINET

BACKGROUND

The present invention generally relates to traffic control infrastructure, and more specifically, to a smart traffic controller cabinet.

Traffic controller cabinets are located at major traffic intersections throughout municipalities. Traffic controller cabinets include hardware and software components for controlling traffic flow at intersections to ensure that traffic flow integrity is maintained and collision risk is mitigated at these intersections. Various components of a traffic controller cabinet may suffer damage due to weather and ordinary use over time, and may require repair or replacement.

SUMMARY

Example embodiments of the present invention are directed to a computer-implemented method for authorizing access to a traffic controller cabinet. A non-limiting example of the computer-implemented method includes transmitting, from a traffic controller cabinet, a first input indicative of an identity of an individual accessing the traffic controller cabinet. The method further includes receiving an indication that the individual is not authorized to access the traffic controller cabinet. The method further includes restricting modification of a traffic controller cabinet component based at least in part on the individual not being authorized to access the traffic controller cabinet.

Example embodiments of the present invention are also directed to systems and computer program products for authorizing access to a traffic controller cabinet, where the systems and computer program products are configured to perform the above-referenced method.

DETAILED DESCRIPTION

Traffic controllers monitor and control traffic lights, receive data from traffic sensors, and transmit and receive data from municipal traffic systems. Traffic controllers are housed in traffic controller cabinets and are found at almost all intersections equipped with traffic signals. From time to time, traffic controllers must be maintained, serviced, and/or repaired. Traffic controller cabinets typically include a locking mechanism to prevent unauthorized access. Keys to unlock the locking mechanism are typically provided to certain individuals who are authorized to access the traffic controller cabinet such as a service technician. Moreover, multiple traffic controller cabinets—even ones operated by different municipalities—can be unlocked using the same keys. As such, there currently exists no reliable system for determining how many individuals access a cabinet over any given time period or if it is an authorized individual who is actually accessing a particular cabinet.

Example embodiments of the present invention provide a real-time traffic controller cabinet monitoring system and corresponding method for verifying that an individual is authorized to access the traffic cabinet and utilizing an access blocking mechanism to prevent an unauthorized individual from making any modification to one or more components of the traffic controller cabinet. In some example embodiments, the traffic controller cabinet is equipped with one or more biometric sensors such as an image capturing device. The image capturing device can be coupled with facial recognition software to compare a captured image with an enrolled image. The image capturing device can also transmit a captured image to a municipal authority responsible for a manual verification process. In some example embodiments, the traffic controller device is equipped with other biometric sensors to automatically verify an unknown entity. If an identity of a person accessing a cabinet is not verified, the system can issue an alert to the authorities and restrict access to the traffic controller software.

Figure 1:
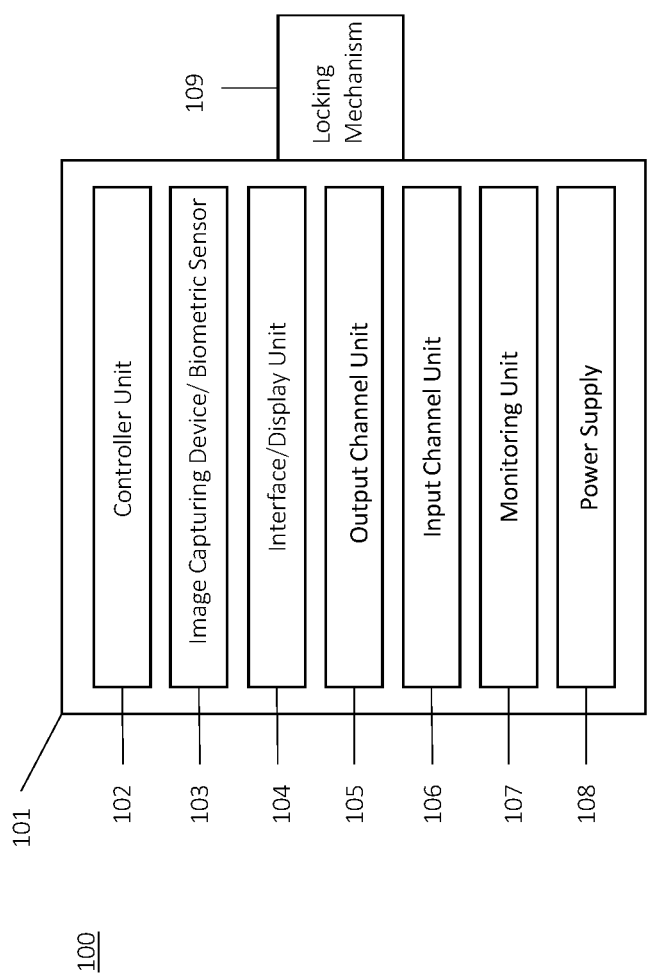
FIG. 1 depicts a block diagram of a traffic controller cabinet according to one or more example embodiments of the present invention.

Referring to FIG. 1, a block diagram of a traffic controller cabinet 100 is provided. The traffic controller cabinet is a weatherproof container 101 for housing various electrical hardware components necessary for efficient traffic control. The traffic controller can be programmed with executable instructions that receive data from sensors and control a sequence of lights of a traffic light and implement various traffic control schemes. The cabinet 100 includes a controller unit 102, a verification mechanism 103, an interface 104, an output channel unit 105, an input channel unit 106, a monitoring unit 107, and a power supply 108. Access to the traffic controller cabinet 100 is restricted by a locking mechanism 109.

The traffic controller cabinet 100 can be customized to accommodate the requirements the traffic controller authority. The cabinet can be configured to have single, dual, or quad doors. Each door can provide access to one or more receptacle that house various components. An additional access can be included to permit law enforcement or emergency services personnel to quickly access the cabinet.

Each receptacle employs a modular rack system that uses multiple racks that can be reconfigured based upon the size, functionality, and desired placement of the components. The racks can be removed and positioned upon tracks connected to the cabinet. The racks provide support for the various components. This modular design of the racks permits the spaces between racks to be modified to accommodate different sizes of components. In addition, the cabinet 100 is equipped with weatherproofing material to protect against the elements. The cabinet 100 is additionally equipped with a temperature regulating equipment to protect against extreme temperature (not shown). For example, the cabinet can be equipped with a temperature sensing device and a temperature control device to raise the internal temperature once the temperature goes below a threshold value.

Figure 2:
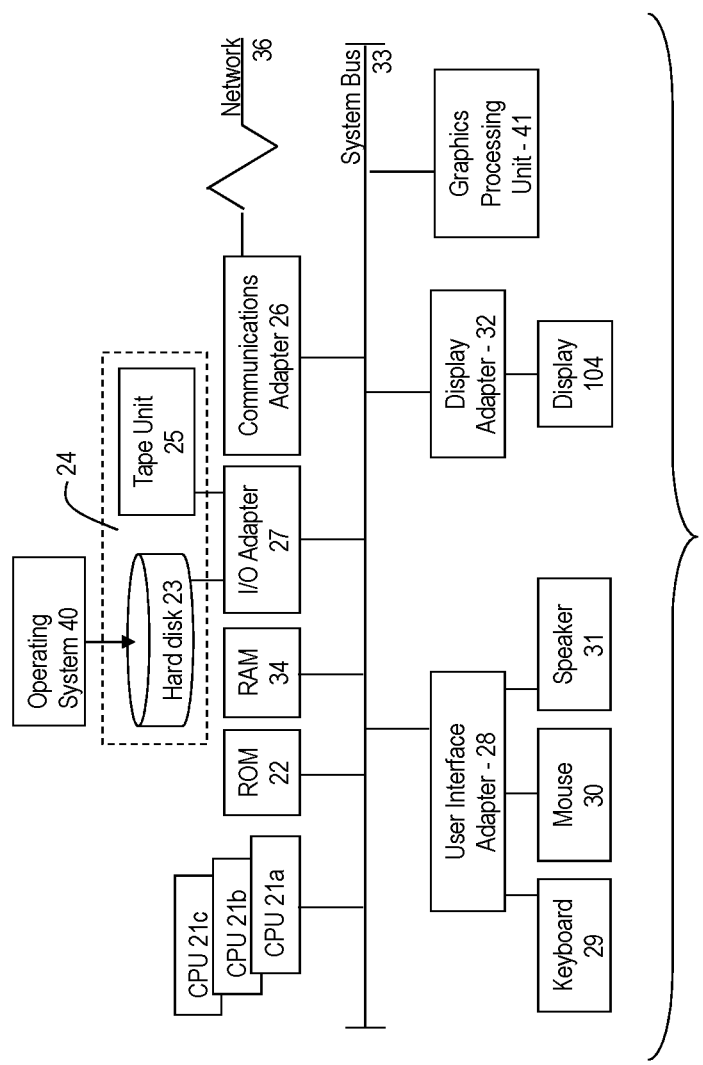
FIG. 2 depicts a block diagram of a computer system configured to implement one or more example embodiments of the present invention.

Referring to FIG. 2, there is shown an example embodiment of a controller unit 102 for implementing the teachings herein. In this example embodiment, the controller unit 102 has one or more central processing units (processors) 21*a*, 21*b*, 21*c*, etc. (collectively or generically referred to as processor(s) 21). In one or more example embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of unit 102.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the controller unit 102 may be stored in mass storage 24. A network adapter 26 interconnects bus 33 with an outside network 36 enabling controller unit 102 to communicate with other such systems. A screen (e.g., a display monitor) 104 is connected to system bus 33 by display adaptor 32, which may include a graphics adapter to improve the performance of graphics intensive applications and a video controller. In one example embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the controller unit 102 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 2, the controller unit 102 includes processing capability in the form of processors 21, storage capability including system memory 34 and mass storage 24, input means such as keyboard 29 and mouse 30, and output capability including speaker 31 and display 104. In one example embodiment, a portion of system memory 34 and mass storage 24 collectively store an operating system coordinate the functions of the various components shown in FIG. 2.

The display unit 104 includes a graphical user interface (GUI) for accessing various functionalities of the traffic controller cabinet. The display unit 104 provides a visual display indicating a status of the load switches. The graphical user interface can be interacted with in order to initiate verification of the accessing party. The display can also be configured to display current and historical current and voltage levels, execute traffic signal operations and diagnose components. For example, an accessing party can initiate an image scan, fingerprint scan, or other biometric scans to verify identify. The controller unit 102 can be configured to record each time the traffic controller cabinet is accessed and include a timestamp. The controller can also log the duration that the cabinet was accessed, which components were accessed, and any changes to the components. The display can also display a log of all these maintenance related activities.

The output port assembly 105 is a rack mounted unit for providing output channel ports. The unit includes dual channel and high density switch packs (HDSP) to support a large number of switch ports. Each dual channel and HDSP supports multiple output channels. The output port assemblies can be configured to operate under different voltage and AC regimes. If additional output channels are required, the traffic controller cabinet can support multiple output channel units. The output port assembly 105 is equipped with resettable fuses to protect against high currents.

The input port assembly 106 is a rack mounted component for supporting input channel ports. The input modules can be configured to support multiple channels by using a combination of input channel racks. Each channel rack can be equipped with at least one stimulation isolation unit (SIU) that can provide multiple optically-isolated inputs. Each SIU can operate under a constant current and voltage. The SIUs can also be configured to operate in bipolar, pulse, and DC modes. In some example embodiments, the input ports are swappable. Detector cards for detecting input signals can be added or removed depending upon a desired application. Although the figures show one input port assembly, multiple assemblies can be included to accommodate system requirements.

The monitoring unit 107 is a modular cabinet malfunction management system. The unit can be rack mounted or affixed to the cabinet. The unit is configured to monitor internal faults for cabinet components. The unit continuously monitors and logs characteristic parameters of each component. The log can provide an accessing party with a running status of each component. By reviewing the log, a service technician can easily identify, isolate, and diagnose malfunctioning components to initiate repair.

The monitoring unit 107 can be configured to monitor and log load currents and voltages. A display of LEDs can provide output voltages and indicate which channels are being operated. Another LED can provide an indication that a component is malfunctioning.

The power supply 108 provides primary and auxiliary power to the traffic controller cabinet. This unit can be mounted on a rack and be connected to an external power source. The power supply 108 provides regulated DC power, unregulated AC power, and a line frequency reference for a detector rack, bus interface units, load switches, and other components. Serial bus connectors are provided to support multiple connected units. The connection ports can be configured to support each component in the traffic cabinet regardless of manufacturer. A load shedding can be enabled to interrupt a supply of electricity to prevent an overload or for ultra-low power applications.

The power supply 108 can be equipped with an LED display to display a power output status and fuse integrity. The power supply 108 can be configured to include various input/output ports including an AC neutral line, an AC input line a line frequency reference output, a ground line, a DC output line, and a reserve line. Additionally, fuses can be provided to protect the traffic controller cabinet from power surges. The power supply can support power from traditional, reusable energy sources, or alternative energy sources for off-grid applications.

Figure 3:
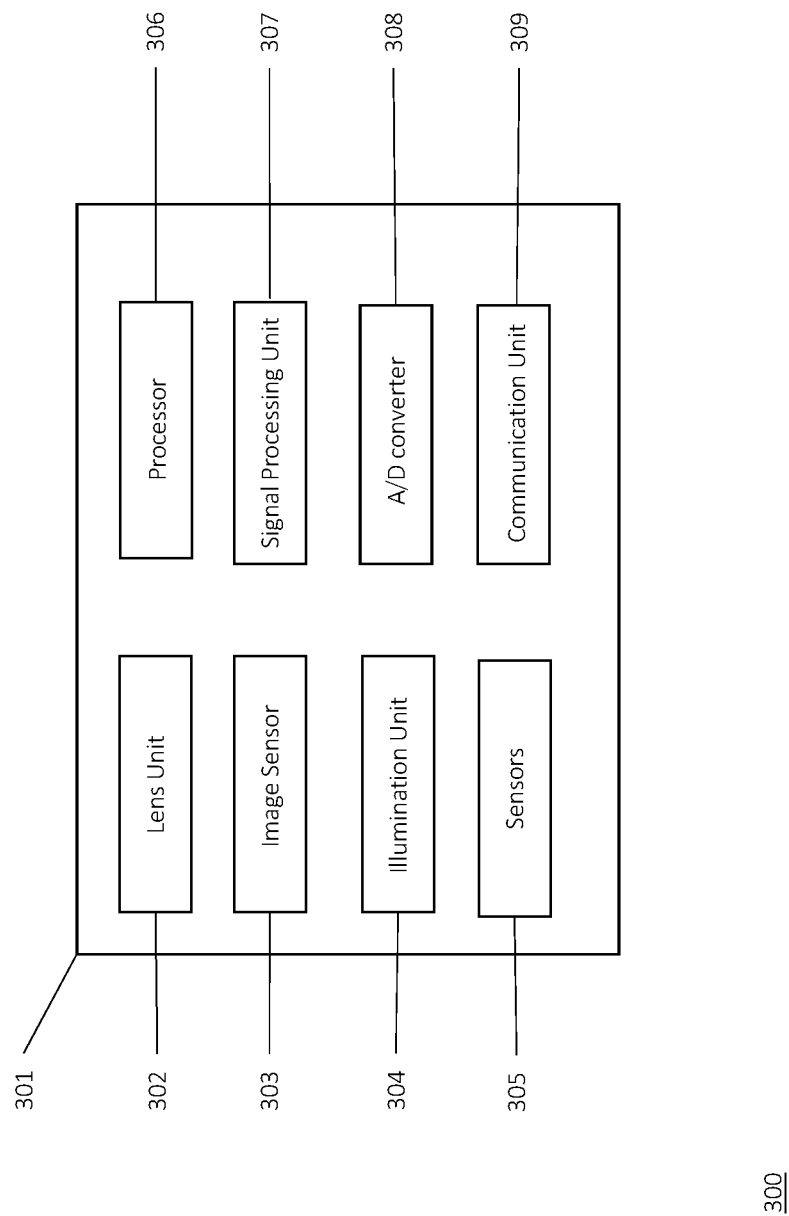
FIG. 3 depicts a block diagram of an image capturing device according to one or more example embodiments of the present invention.

In order to monitor a person or person accessing the traffic controller cabinet, the cabinet can use an image capturing device or other biometric sensors. Referring to FIG. 3, the image capturing device 300 comprises a housing 301, a lens unit 302, an image sensor 303, an illumination unit 304, a plurality of sensors 305, a processor 306, a signal processing unit 307, an analog to digital converter 308, and a communications unit 309 is shown.

The housing 301 provides protection for the lens unit. Another function of the housing 301 is to provide a mount for lenses and other apparatuses of the device 300. The housing 301 comprises metal, plastics, or any other materials to protect the image capturing device 300 from weather elements including temperatures, rain, and snow.

The lens unit 302 includes a set of optical lenses arranged sequentially from an object side to an image side. The optical lens set is configured to receive light waves reflected from an object and direct these waves towards the surface of an image sensor. Each lens of the lens unit is configured to modify the light waves. The lens unit 302 can be configured to have a zoom function. The lens unit 302 can include a lens moving apparatus for moving one or more lenses of the lens unit to focus on an object.

The image sensor 303 receives the directed light waves from the lens unit 302. When the image capturing device 300 is in operation, light directed from the lens unit 302 strikes the surface of the image sensor 303. The image sensor 303 comprises a set of optically excited regions that each represent a pixel. The image sensor 303 can be either a charged coupled device (CCD) sensor or complimentary metal-oxide semiconductor (CMOS) sensor. Both image sensors can take as inputs photon from the light waves and generates a sequence of voltages representing the image. The analog to digital converter can convert the analog voltage signal to a digital signal. The digital signal processing unit 307 receives the digital sequence and processes the image. The communications unit 309 can receive and transmit data including images to and from an external source including a municipality.

The illumination unit 304 can provide an additional light source for illuminating an object. The illumination unit 304 can include a flash and a triggering mechanism. The illumination unit can include a single light emitting diode (LED) or an array of LEDs. The LED array can be configured to simultaneously flash or in an ordered sequence. The processor 306 can use sensors 305 to detect a light intensity, motion, or a timing to initiate flash. The sensors 305 can include pressure sensors for sensing when the traffic controller cabinet is opened, a light sensor for detecting ambient light, motion sensors for sensing motion, and a timing mechanism for detecting the time of day that the traffic controller cabinet has been opened. In some example embodiments, the illumination unit 304 can be configured to automatically provide light during certain hours of the day. In some example embodiments, the illumination unit 304 can be coupled to a pressure sensor 305 and be triggered upon the doors of the traffic controller cabinet opening. The illumination unit 304 can also be manually activated in the event that a person being imaged notices that the additional light is required.

The image capturing device 300 can be configured to capture a still photo or to capture video footage. The image capturing device 300 can be communicatively coupled to a municipality's computer system or a service provider's system. The video can record an initial interaction with the traffic controller cabinet or an entire maintenance session from opening to closing the cabinet. In some example embodiments, the image capturing device can provide real-time captured images of the accessing party. A municipality can access software that provides the image of the accessing party. The municipality can then verify that the accessing party is authorized to access the traffic controller box and either permit access or trigger an alert that restricts access to the system and issues an alert. The alert can be issued to the authorities or the accessing party and notify them that they are either at the incorrect location or not authorized to access the cabinet.

The image capturing device 300 can be coupled with the display unit 104 and display the captured image of the accessing party. The accessing party can self-regulate the image and move when appropriate to provide a full view of facial features or initiate the illumination unit 304 to provide additional light. The display can be configured to display illustrated lines to provide a position for the accessing party's facial features. Once an image or video is captured, a log can be created each instance of access to the traffic controller box. The log can annotate each image with a time stamp, geolocation information, an identification of the authorized accessing party, and a description of the maintenance scheduled to be performed.

In some example embodiments, the image capturing device provides the input for facial recognition software. Parties who seek to access traffic controller cabinets can enroll their image into an identification system and the facial recognition algorithm can verify their identity.

The traffic controller cabinet can employ additional biometric sensors. The biometric sensor can be configured to sense various biometric characteristics of an accessing party. The biometric characteristic can sense intrinsic characteristics such as fingerprint, blood pressure, or a heart rate, or it may be some learned characteristic such as handwriting or voice patterns. The sensed biometric characteristic should be unique for each person and be difficult to duplicate by an individual not authorized to access the traffic controller cabinet.

In some example embodiments, an accessing party's identity can be verified through other biometric sensors. These biometric sensors are transducers that convert biometric signals from the accessing party into an electrical signal. These electrical signals can be used to verify identity through comparison with a baseline signal that has been previously recorded from the accessing party. The biometric sensors can include physiological and behavioral sensors including but not limited to iris recognition, voice recognition, signature recognition, or DNA recognition sensors.

Figure 4:
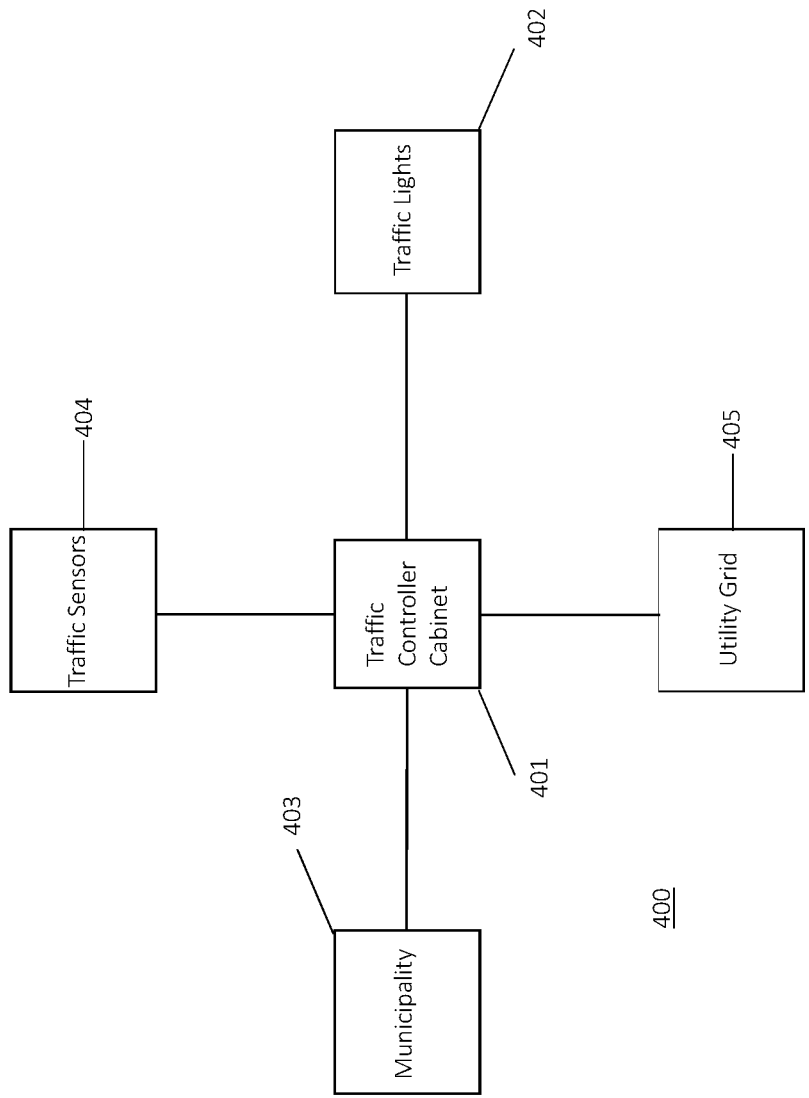
FIG. 4 depicts a block diagram of an interconnected traffic controller system according to one or more example embodiments of the present invention.

Referring to FIG. 4, a depiction of a block diagram of a traffic control system 400 according to one or more example embodiments of the present invention is shown. The traffic controller cabinet 401 can be configured to control the operation of traffic lights 402 at one or more traffic intersections. To assist with monitoring and controlling a flow of traffic, traffic sensors 404 placed in and around the traffic intersections can record and transmit traffic related data to the traffic controller cabinet 401. A municipal traffic controller 403 can remotely monitor the traffic controller cabinet 401 by receiving characteristic component data and data regarding the identity of an individual accessing the traffic controller cabinet 401.

Figure 5:
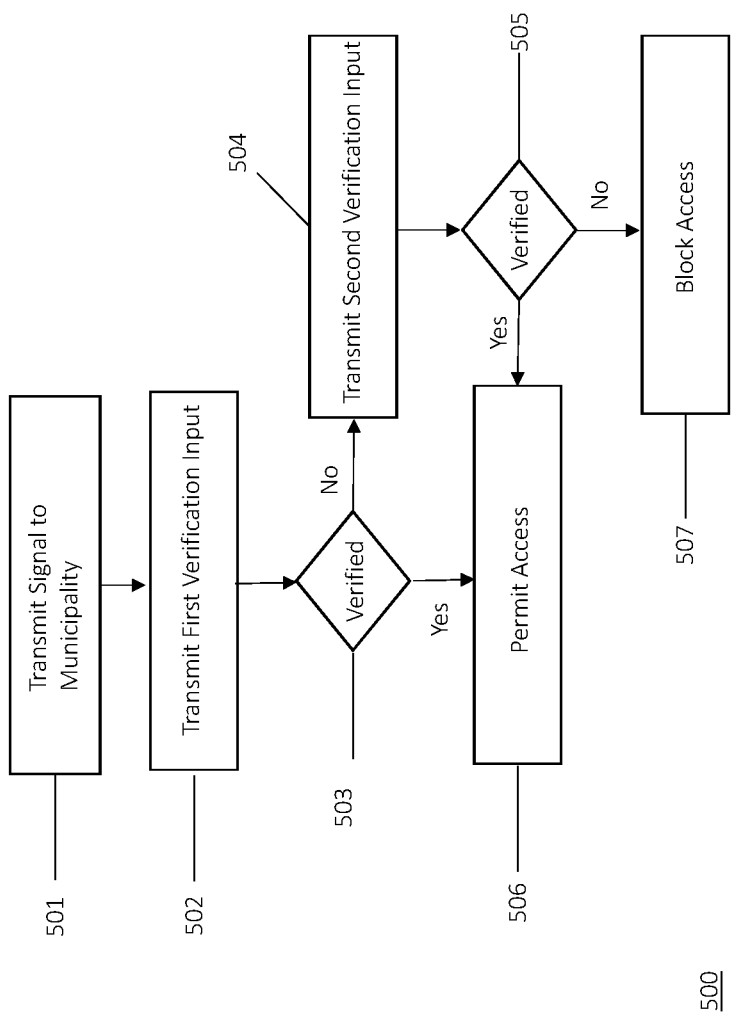
FIG. 5 depicts a flow diagram of a method for permitting or preventing access to a traffic controller cabinet according to one or more example embodiments of the invention.

Referring to FIG. 5, a flow diagram of a method of verifying an identity of a person accessing a traffic controller cabinet is shown. A traffic controller cabinet that has been opened can transmit a signal to a central authority 501. The signal can be generated automatically or in the alternative manually. A person accessing the traffic controller cabinet can transmit an image to the central authority 502. In some example embodiments, the image will be a still image of the parties, in other example embodiments, a video recording of the party can be transmitted. The identity of the person is verified by either a manual system in which another individual recognizes and verifies identity or automatically through facial recognition software 503. If the person's identity is verified, the central authority can grant or restrict access to traffic controller cabinet 506, 507. The central authority can manually initiate a blocking mechanism that restricts the accessing party's ability to operate the system and notify the appropriate authorities. In this instance, the traffic controller cabinet is configured to continue operation but restrict any modifications to the system. In other example embodiments, in which facial recognition software is utilized, the central authority is configured to automatically grant or restrict access to the system.

In some example embodiments, the traffic controller cabinet has only one verification device. In other example embodiments, the traffic controller cabinet can have more than one verification device. A second or subsequent verification method can be through the use of other biometric sensors 505. For example, the system can verify identify through a fingerprint scan and/or an iris recognition can be performed on the accessing party. In some example embodiments, the second or subsequent verification occurs when the first verification has failed. In other example embodiments, the second or subsequent verification is in addition to the first verification. If the person's identity is verified by a second or subsequent verification, the central authority can grant or restrict access to traffic controller cabinet 506, 507.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to example embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example embodiments of the present invention have been presented for purposes of illustration, but are not intended to be exhaustive or limited to the example embodiments disclosed. Many modifications and variations will be apparent to those of ordinary skill in the art without departing from the scope and spirit of the described example embodiments. The terminology used herein was chosen to best explain the principles of the example embodiments, the practical application or technical improvement over technologies found in the marketplace, or to enable others of ordinary skill in the art to understand the example embodiments described herein.

What is claimed is:

1. A computer-implemented method for authorizing access to a traffic controller cabinet, the method comprising:
    receiving, at a traffic controller cabinet, a first input indicative of an identity of an individual attempting to access the traffic controller cabinet;
    determining, based at least in part on the first input, as a first determination that the individual is not authorized to access the traffic controller cabinet;
    receiving, at the traffic control cabinet, a subsequent second input indicative of the identity of the individual, wherein the subsequent second input is distinct from the first input;
    determining, based at least in part on the subsequent second input, as a second determination that the individual is not authorized to access the traffic controller cabinet; and
    preventing modification of a component of the traffic controller cabinet based at least in part on the second determination that the individual not authorized to access the traffic controller cabinet.

2. The computer-implemented method of claim 1, wherein the first input is an image or a biometric signal.

3. The computer-implemented method of claim 1, wherein the individual is a first individual, the method further comprising:
    receiving, at the traffic controller cabinet, a second input indicative of an identity of a second individual attempting to access the traffic controller cabinet;
    determining, based at least in part on the second input, that the second individual is authorized to access the traffic controller cabinet; and
    permitting modification of the component of the traffic controller cabinet based at least in part on determining that the second individual is authorized to access the traffic controller cabinet.

4. The computer-implemented method of claim 1, further comprising:
    sending, by the traffic controller cabinet, the first input to a remote entity; and
    receiving, at the traffic controller cabinet from the remote entity, an indication that the individual is not authorized to access the traffic controller cabinet.

5. The computer-implemented method of claim 1, wherein the first input is an image of the individual, and wherein determining that the individual is not authorized to access the traffic control cabinet comprises utilizing a facial recognition technique to determine that the image of the individual does not match any image in a set of images of authorized individuals.

6. The computer-implemented method of claim 1, wherein the component of the traffic controller cabinet is a software component.

7. A system for authorizing access to a traffic controller cabinet, the system comprising:
    a traffic controller cabinet comprising a processor,
    wherein the processor is communicatively coupled to a memory, the processor being configured to:
    receive a first input indicative of an identity of an individual attempting to access the traffic controller cabinet;
    determine, based at least in part on the first input, as a first determination that the individual is not authorized to access the traffic controller cabinet;
    receive a subsequent second input indicative of the identity of the individual, wherein the subsequent second input is distinct from the first input;
    determine, based at least in part on the subsequent second input, as a second determination that the individual is not authorized to access the traffic controller cabinet; and
    prevent modification of a component of the traffic controller cabinet based at least in part on the second determination that the individual not authorized to access the traffic controller cabinet.

8. The system of claim 7, wherein the first input is an image or a biometric signal.

9. The system of claim 7, wherein the individual is a first individual, the processor being further configured to:
    receive, at the traffic controller cabinet, a second input indicative of an identity of a second individual attempting to access the traffic controller cabinet;
    determine, based at least in part on the second input, that the second individual is authorized to access the traffic controller cabinet; and
    permit modification of the component of the traffic controller cabinet based at least in part on determining that the second individual is authorized to access the traffic controller cabinet.

10. The system of claim 7, the processor being further configured to:
    send, by the traffic controller cabinet, the first input to a remote entity; and
    receive, at the traffic controller cabinet from the remote entity, an indication that the individual is not authorized to access the traffic controller cabinet.

11. The system of claim 7, wherein the first input is an image of the individual, and wherein determining that the individual is not authorized to access the traffic control cabinet comprises utilizing a facial recognition technique to determine that the image of the individual does not match any image in a set of images of authorized individuals.

12. The system of claim 7, wherein the component of the traffic controller cabinet is a software component.

13. A computer program product for authorizing access to a traffic controller cabinet, the computer product comprising a computer readable storage medium having program instructions embodied therewith, the instructions executable by a processor to cause the processor to:
receive a first input indicative of an identity of an individual attempting to access the traffic controller cabinet;
determine, based at least in part on the first input, as a first determination that the individual is not authorized to access the traffic controller cabinet;
receive, at the traffic control cabinet, a subsequent second input indicative of the identity of the individual, wherein the subsequent second input is distinct from the first input;
determine, based at least in part on the subsequent second input, as a second determination that the individual is not authorized to access the traffic controller cabinet; and
prevent modification of a component of the traffic controller cabinet based at least in part on the second determination that the individual not authorized to access the traffic controller cabinet.

14. The computer program product of claim 13, wherein the first input is an image or a biometric signal.

15. The computer program product of claim 13, the processor further configured to:
receive, at the traffic controller cabinet, a second input indicative of an identity of a second individual attempting to access the traffic controller cabinet;
determine, based at least in part on the second input, that the second individual is authorized to access the traffic controller cabinet; and
permit modification of the component of the traffic controller cabinet based at least in part on determining that the second individual is authorized to access the traffic controller cabinet.

16. The computer program product of claim 13, the processor being further configured to:
send, by the traffic controller cabinet, the first input to a remote entity; and
receive, at the traffic controller cabinet from the remote entity, an indication that the individual is not authorized to access the traffic controller cabinet.

17. The computer program product of claim 13, wherein the first input is an image of the individual, and wherein determining that the individual is not authorized to access the traffic control cabinet comprises utilizing a facial recognition technique to determine that the image of the individual does not match any image in a set of images of authorized individuals.

\* \* \* \* \*